Figure 1:
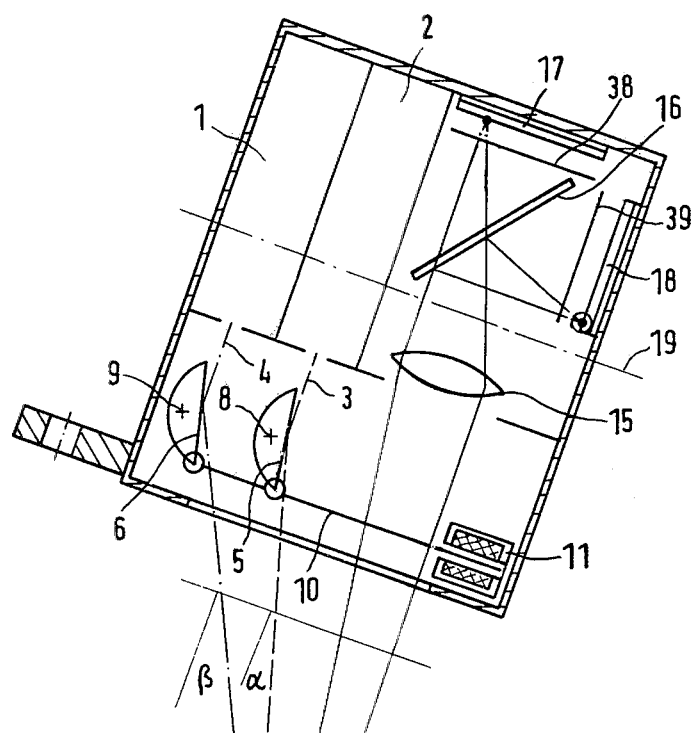
Figure 1:
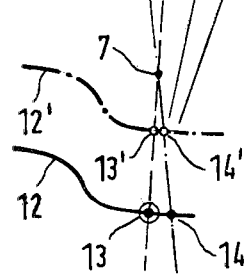

United States Patent [19]

Richter

[11] 4,325,639

[45] Apr. 20, 1982

[54] METHOD FOR MEASURING DISTANCES AND APPARATUS FOR PERFORMING THE METHOD

[75] Inventor: Hans Richter, Augsburg, Fed. Rep. of Germany

[73] Assignee: H. A. Schlatter AG, Schlieren, Switzerland

[21] Appl. No.: 117,994

[22] Filed: Feb. 4, 1980

[51] Int. Cl.³ .............................................. G01B 11/24
[52] U.S. Cl. .......................................... 356/376; 356/1
[58] Field of Search ....................... 356/1, 4, 373, 376, 356/375

[56] References Cited

U.S. PATENT DOCUMENTS

| 2,305,437 | 12/1942 | Meyers et al. | 356/1 |
| 2,376,836 | 5/1945 | Tunnicliffe | 356/1 |
| 3,187,185 | 6/1965 | Milnes | 356/1 |
| 3,693,143 | 9/1972 | Kennedy | 356/1 |
| 3,796,492 | 3/1974 | Cullen et al. | 356/1 |
| 3,817,635 | 6/1974 | Kawahara | 356/373 |

FOREIGN PATENT DOCUMENTS 54-4162 1/1979 Japan .................... 356/375

Primary Examiner—R. A. Rosenberger
Attorney, Agent, or Firm—E. E. Pascal

[57] ABSTRACT

A method for measuring distances and for determining the three-dimensional contour of a workpiece, wherein two intersecting light beams are directed onto the workpiece, the light points produced by the beams on the workpiece surface are determined and the angle of inclination of the striking beam in the common plane thereof is measured.

11 Claims, 2 Drawing Figures

METHOD FOR MEASURING DISTANCES AND APPARATUS FOR PERFORMING THE METHOD

The invention relates to a method for measuring distances and for determining the three-dimensional contour of a workpiece and also relates to apparatuses for performing the method.

When measuring distances and when determining the three-dimensional contour of a workpiece it is known to use mechanical calipers, which determine the distance or scan the three-dimensional contour of a workpiece. The scanned values are converted into electrical signals by transducers and these signals are then indicated or stored. These measuring methods are time-consuming and can only be used if the distance to be measured is within the given range or the contour to be determined permits a mechanical scanning. It is also known to measure distances electronically or electron-optically. The microwaves or light waves emitted by a transmitter are reflected and collected by a receiver. The phase difference between the emitted and the received wave serves as a measure for the distance. However, such measuring methods are complicated and are only used when measuring long distances.

The problem of the invention is therefore to so further develop a contactless distance measuring method that it is possible in a simple manner to measure distances and three-dimensional contours in the range of up to a few meters.

This problem is solved by the features of claim 1. Advantageous further developments can be gathered from the subclaims.

The present measuring method is particularly suitable for operating devices for recognising opticals which are not programmed in and for determining the distance, shape and position of workpieces, which are to be determined by the operating device and whose contour has previously been electronically stored.

Embodiments of the invention are explained hereinafter relative to the drawings, wherein show:

FIG. 1 a first embodiment of the apparatus for performing the method.

Figure 2:
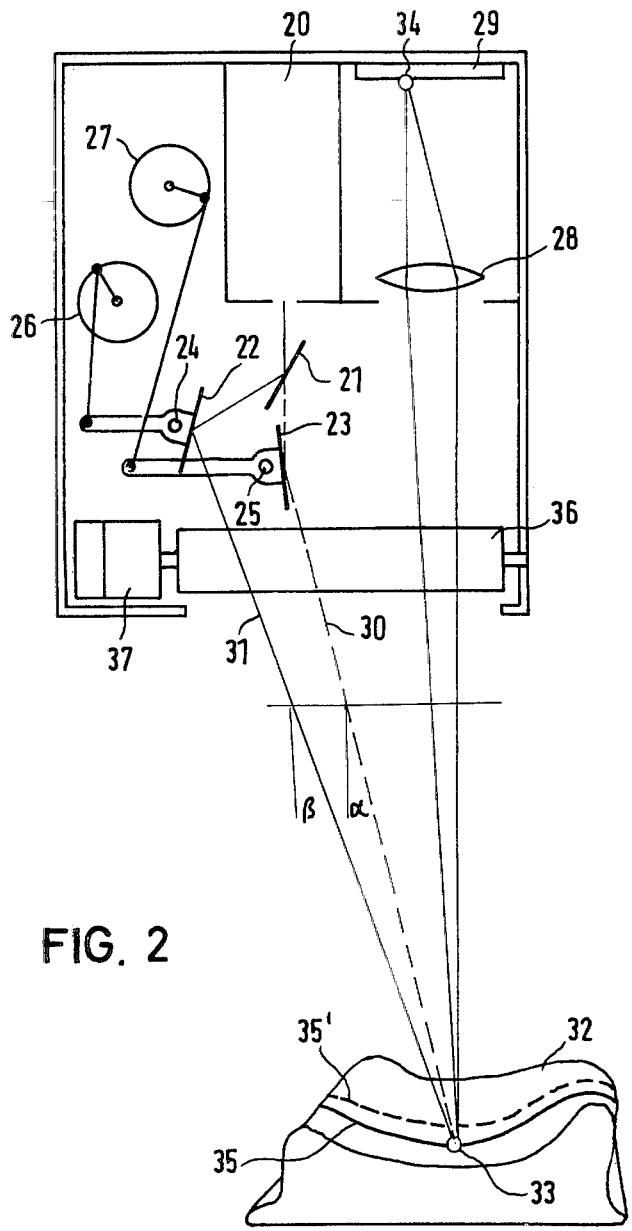

FIG. 2 a second preferred embodiment.

In the embodiment according to FIG. 1 the two laser beam generators 1, 2 generate light beams 3, 4 which have different wavelengths, for example the light beam 3 is blue and the light beam 4 is red. The two light beams 3, 4 are deflected by the mirrors 5, 6 and intersect at point 7. To this end, the two mirrors 5, 6 are slightly inclined towards one another. Mirrors 5, 6 can be rotated about the points 8, 9 and are articulated to a common swivel mechanism 10. The swivelling movement of the two mirrors 5, 6 is performed by a motor 11, which is schematically indicated. In this way, the mirrors 5, 6 perform a reciprocating swivelling movement, the particular mirror position being read electrically by the motor 11.

The two intersecting beams 3, 4 strike the workpiece surface 12 at different points. The impact point of the blue beam 3 is indicated by the reference numeral 13 and that of the red beam by 14.

These light points are determined by a collecting optics 15 and are projected onto a semitransparent mirror 16. This semitransparent mirror separates the light in accordance with the different wavelengths, for example the blue light is permitted to pass through and the red light is reflected. A photodiode screen 17 is positioned behind the semitransparent mirror 16 inclined by 45°. A further photodiode screen 18 is positioned at right angles to the first screen.

In this way, the blue light point 13 is imaged on screen 17 and the red light point 14 on screen 18. The distance on the workpiece contour 12 between points 13 and 14 can now be calculated through the position of mirrors 5, 6, whose value is read by motor 11 and by the coordinates of the imaging points on screen 18, 17.

If the workpiece contour 12' is closer to the measuring device, then in the case of the same mirror position the light points 13', 14' are closer together, so that the coordinates of the imaging points on the screen 17, 18 have changed. In this way, it is possible to completely satisfactorily calculate the distance and contour along a coordinate.

The complete measuring apparatus can be pivoted along an axis 19, so that the contours parallel to contour 12 can also be determined. However, it is also possible to provide a further swivelling mirror arrangement, as will be described hereinafter in conjunction with FIG. 2.

In the embodiment of FIG. 2, only one laser beam generator 20 is provided. The laser beam generated by it strikes a rigidly arranged semitransparent mirror 21, which permits the passage of part of the beam and reflects a further part thereof. The reflected beam portion strikes a mirror 22, whilst the beam portion which has passed through strikes a mirror 23. Mirror 22 is pivoted at 24 and mirror 23 at 25. By means of lever arms they are connected in each case to separate swivel drives 26, 27. The position of the mirror is read electrically through the position of the swivel drive 26, 27. The measuring apparatus has a collecting optics 28 and a photodiode screen 29.

The swivel drive 27 moves rapidly, whilst swivel drive 26 moves slowly in comparison therewith. This means that the beam 30 reciprocates rapidly and beam 31 reciprocates slowly. Thus, beam 30 moves along beam 31. The two beams 30, 31 strike the material surface 32 where they produce separate light points. The latter are imaged on screen 29. If the beams 30, 31 intersect on material surface 32 a common impact and intersection point 33 is obtained. Correspondingly, only one imaging point 34 is formed on screen 29. In this case, i.e. if screen 29 only records a single imaging point 34, a call signal is given by screen 29 which determines the position of the swivel drives 26, 27 at this moment and consequently the position of mirrors 22, 23. The position of mirrors 22, 23 is a measure of the distance from impact point 33. The contour 35 of workpiece surface 32 can be scanned with this arrangement.

For scanning the adjacent contour 35' a further swivel mirror 36 is provided and the beams reflected by mirrors 22, 23 strike mirror 36 and are then reflected again. The position of mirror 36 is determined by a swivel drive 37.

If the semitransparent mirror 16 shown in FIG. 1 does not perform a colour separation a red and a blue filter 38, 39 can be positioned in front of the relevant screen 17, 18.

The angular position $\alpha$ and $\beta$ of the beam striking the material surface and the coordinates of the imaging points 13, 14 on screen 17, 18 or the coordinates of imaging points 34 of the intersection point 33 on screen 29 are important for the present method.

In the embodiment according to FIG. 1, the angles $\alpha$ and $\beta$ are directly related with one another due to the common swivel mechanism. Thus, a particular angular position α and β is associated with each swivel mechanism position. Thus, the distance between points 13 and 14 determined by the imaging coordinates on screen 17, 18 is determinative for the distance between the measuring device and contour 12 for a given angular position α,β. Thus, for distance measurements a given position of the swivel mechanism is determined which corresponds to a given angular position α,β and the imaging coordinates of points 13, 14 are measured. The position of the swivel mechanism and the imaging coordinates are fed into a computer which, for the particular angular position α,β calculates the distance between points 13 and 14 and from said distance value and the angular position α,β calculates the distance between the measuring device and points 13, 14.

If this is performed for successive angular positions α,β the computer calculates the distance of the measuring device from each point of contour 12 and consequently also the course of the contour. This procedure can be performed in punctiform digital or continuous analog manner.

In the embodiment of FIG. 2, the particular angular position α,β is determined when the beams 30, 31 intersect on contour 35, i.e. only one point appears on the screen 29. The distance between the measuring device and point 33 is then calculated from the values α and β which are supplied to a computer. The processing of the coordinates of imaging points 34 is not necessary, but can be carried out in order to increase the reliability of the measurement. If the said distance measurement is performed along the contour 35, it is possible to determine the distance of each point on contour 35 and consequently also the course of the actual contour.

I claim:

1. A method for measuring distances and for determining the three-dimensional contour of a workpiece comprising directing two light beams of different wavelengths onto the workpiece, pivoting the beams in their common plane, pivoting the common plane around an axis which is common to said plane, measuring the angles of inclination of the lightpoints produced by the beams on the workpiece surface in the different wavelengths, determining the position of the image of each light point and calculating the distances and the contour using the angles of inclination and the positions of the images.

2. A method for measuring distances and for determining the three-dimensional contour of a workpiece comprising directing two light beams onto the workpiece, pivoting the beams in their common plane with different velocities, pivoting the common plane around an axis which is common to said plane, measuring the angles of inclination of each beam in the common plane when the beams intersect on the workpiece surface, determining the position of the image of the intersection lightpoint produced by the beams on the workpiece surface and calculating the distances and the contour using the angles of inclination and the position of the image of the intersection lightpoint.

3. An apparatus for measuring distances and for determining the three-dimensional contour of a workpiece comprising means for directing a pair of light beams of different wavelengths onto the workpiece, a pair of spaced mirrors, each adapted to reflect one of the beams, means for swivelling the mirrors to change the angles of the mirrors, a collecting optic for collecting the images of the light points produced by said beams on the workpiece surface, a semi-transparent mirror arranged behind the collecting optic for permitting the passage of a part of the light to a first screen, sensitive to light of one of the wavelengths and reflecting another part of the light to a second screen, sensitive to the light of the other wavelength, and means for determining the angles of the mirrors.

4. An apparatus for measuring distances and for determining the three-dimensional contour of a workpiece comprising means for directing a pair of lightbeams onto the workpiece, a pair of spaced mirrors, each adapted to reflect one of the beams, separate swivelling mechanisms for swivelling the mirrors to change the angles of the mirrors with different velocities, a collecting optic for collecting the images of the lightpoints produced by said beams on the workpiece surface, a screen arranged behind the collecting optic and means for determining the angles of the mirrors when a single lightpoint is imaged on the screen.

5. An apparatus according to claim 3 wherein said means for swivelling is a common mechanism for swivelling the mirrors.

6. An apparatus according to one of the claims 3 or 4, including a further swivelling mirror for deflecting the beams from said pair of mirrors, and means for measuring the position of the further mirror.

7. An apparatus accordong to one of the claims 3 or 4, in which the beams are laser beams.

8. An apparatus according to claim 3 further including two laser beam generators for generating said light beams, each with a different wavelength.

9. An apparatus according to claim 4, further including one laser beam generator for generating a single source beam, and a fixed semitransparent mirror for splitting the source beam into said pair of light beams located between the generator and two other mirrors.

10. An apparatus according to one of the claims 3 or 4, in which the screen is a photodiode array.

11. An apparatus according to claim 3, further including a filter in front of each of the screens, one filter permitting the passage of light of one wavelength and the other permitting the passage of light of the other wavelength.

* * * * *